United States Patent [19]
Baus et al.

[11] Patent Number: 5,733,394
[45] Date of Patent: Mar. 31, 1998

[54] RADIAL AGRICULTURAL TIRE WITH A PITCHED TREAD

[75] Inventors: Andre Emile Joseph Baus, Bettembourg, Luxembourg; Michel Marguerite Walther Ghisland Constant, Bastogne, Belgium

[73] Assignee: The Goodyear Tire & Rubber Company, Akron, Ohio

[21] Appl. No.: 668,602

[22] Filed: May 20, 1996

Related U.S. Application Data

[63] Continuation-in-part of Ser. No. 445,145, May 19, 1995, abandoned.

[51] Int. Cl.⁶ ............... B60C 107/02; B60C 113/00; B60C 121/00
[52] U.S. Cl. .................... 152/209 B; 152/209 R
[58] Field of Search ................. 152/209 R, 209 B, 152/209 D

[56] References Cited

U.S. PATENT DOCUMENTS

| | | |
|---|---|---|
| 3,023,798 | 3/1962 | Moore et al. . |
| 3,094,157 | 6/1963 | Klohn .................... 152/209 R |
| 4,178,199 | 12/1979 | Lipman et al. . |
| 4,186,788 | 2/1980 | Pommier ................. 152/209 B |
| 4,289,183 | 9/1981 | Abe et al. ............... 152/209 B |
| 4,446,902 | 5/1984 | Madec et al. ............ 152/209 B |
| 4,534,392 | 8/1985 | Bonko et al. ............ 152/209 B |
| 5,002,110 | 3/1991 | Tsurunaga et al. ....... 152/209 B |
| 5,010,935 | 4/1991 | Bonko et al. ............ 152/209 B |
| 5,046,541 | 9/1991 | Bonko .................... 152/209 B |
| 5,337,816 | 8/1994 | Bonko et al. ............ 152/209 R |

FOREIGN PATENT DOCUMENTS

| | | |
|---|---|---|
| 584170 | 9/1986 | Australia ............... 152/209 R |
| 0086172 | 1/1983 | European Pat. Off. . |
| 0442427 | 2/1991 | European Pat. Off. . |
| 0495619 | 1/1992 | European Pat. Off. . |
| 524568 | 1/1993 | European Pat. Off. ..... 152/209 R |
| 0600265 | 8/1994 | European Pat. Off. . |
| 2347215 | 4/1977 | France . |
| 6060011 | 4/1985 | Japan . |
| 6082408 | 5/1985 | Japan . |
| 60-045402 | 11/1985 | Japan . |
| 200006 | 9/1986 | Japan ................... 152/209 R |
| 2070505 | 9/1990 | Japan . |
| 286420 | 10/1994 | Japan ................... 152/209 R |

*Primary Examiner*—Steven D. Maki
*Attorney, Agent, or Firm*—David L. King

[57] ABSTRACT

The present invention relates to an agricultural tire (10) having a casing (12) with a radial ply carcass (14) and an annular tread (40) having two sets (48,50) of lugs (44). The tire (10) has a greatly reduced lug vibration. The tread (10) is divided into a plurality of circumferentially repeating design cycles of at least two, preferably three distinct design cycle lengths. The circumferentially adjacent lugs (44) of the opposite set are offset by at least one design cycle. When the pitch ratio variance of the design cycles is at least 1.1 from small length (S) to large length (L), preferably 1.25 a reduction in lug induced vibration of 30% or more is possible. The lugs 44 preferably have a lug width (W), (W) being proportional to the length of the design cycle in which a majority of the lug lies. This effectively balances the mass of tread rubber around the periphery of the tire.

18 Claims, 15 Drawing Sheets

RADIAL AGRICULTURAL TIRE WITH A PITCHED TREAD

This application is a CIP of Ser. No. 08/445,145 filed May 19, 1995 now abandoned.

BACKGROUND OF THE INVENTION

The present invention relates to radial agricultural tire treads, and more specifically relates to tire treads in which the length of repeating design cycles or pitches are modulated in order to reduce lug impact frequency when the tire rolls on a hard surface. In the past, treads for agricultural tires used with large equipment have been designed by using one repeating design cycle extending circumferentially about the periphery of the tire.

The trend to consolidate separate smaller parcels of land into larger farming operations has necessitated the driving of farm tractors over the hard surface roadways thus connecting the separate parcels. Such operating conditions make the ride characteristics of tractor tires an important design consideration, along with the draw-bar traction characteristics required for operating the tractor in a field where the soil composition often presents a serious traction problem.

It is well known in the tire designing technology that design features aimed primarily at providing the high drawbar traction characteristics needed when a tractor tire is operating in a field may result in less than desirable ride comfort characteristics when the same tractor tire is operated on a hard surface roadway, and vice versa. Heretofore, tractor tires produced in an effort to provide the desired operating characteristics for both on and off-the-road use, such as the tires described in U.S. Pat. No. 3,603,370, issued to E. W. Hylbert et al., had to make trade-offs between draw-bar traction and ride performance levels. It was felt that a design change aimed at improving operating characteristics on hard surfaces necessarily resulted in poorer off-the-road operating characteristics.

Recent attempts to reduce lug induced vibration have been related to the shape and physical orientation of the tread lugs. European Patent Application 0,086,172 to Myron Miles McClain shows that a combination of alternating long and short shoulder lugs could achieve improved ride characteristics.

A later agricultural tread design invented by Mark L Bonko discloses that a tractor tire having two rows of long shoulder lugs and two rows to shorter center lugs could yield surprising traction and ride improvement. This tire is disclosed in U.S. Pat. No. 5,046,547 issued Sep. 10, 1991.

Neither of these inventions contemplated pitching the tread pattern with more than a single uniform pitch.

On Aug. 16, 1994, a U.S. Pat. No. 5,337,816, issued to Mark L Bonko et al. disclosing an irrigation tire tread with each tread half having one long shoulder lug positioned between two pairs of short shoulder lugs. This irrigation tire tread employed three distinct lug spacings $\chi_1$ $\chi_2$ and $\chi_3$ repeated uniformly in combination with the long and short lug pattern described above. The patent discloses, "It is believed that the employment of long and short lugs which are variably spaced as illustrated permits the use of significantly less tread ruber in spite of the fact that there are more lugs." It is further stated that these irrigation tires simply must support the plumbing or irrigation pipes weight and provide sufficient traction to move the irrigation apparatus at very slow speeds sometimes measured in minutes per revolution. The inventor of this irrigation tire never contemplated high speed paved road service conditions. The above-described irrigation tire is believed to be very poor in ride performance under such conditions due to the fact that such design criteria was never considered in the development of that tire.

Historically, pitching farm tires had been attempted to solve lug induced vibration problems in bias ply reinforced tractor tires. Much experimental work went into this effort with no success. It was and still is generally believed that the use of long traction lugs having a very low contact area relative to the overall footprint area of the tread was not conducive to variable pitching to reduce lug impact forces. For that reason, tread patterns have been developed using single pitches and alternatives to the long lug tread pattern.

SUMMARY OF THE INVENTION

Experience has shown that the preceding prior designs results in undesirable long lug impact frequency. Lug impact frequency is a phenomenon of the pitching of the tire and the speed of the vehicle resulting in a vibration or surging in the vertical and horizontal directions. This vibrating or surging is known in the industry as tread lug-induced vibration. The inventors have discovered that it is possible to selectively reduce the impact frequency by using a randomized sequence of pitches or design cycles on the tire. According to the preferred practice of the invention, a 19 random pitched sequence is used to provide a tread pattern having a complimentary Fourier spectrum, such that the total energy generated by the rolling tire is spread as uniformly as possible over the frequency spectrum.

The invention can be applied to an agricultural tire 10 having a casing 12 with a radial ply carcass 14, an axis of rotation R and an annular tread 40 radially outwardly and integrally attached to the radial ply carcass 14. The tread 40 has a first lateral edge 30 and a second lateral edge 32 and an equatorial plane EP, the equatorial plane EP being defined as a plane perpendicular to the axis of rotation R and equidistant from the first and second lateral edge 30,32. The tread 40 also has a first set 48 and second set 50 of lugs 44. The first set 48 has a plurality of substantially parallel lugs 44 extending angularly from the first tread edge 30 toward the equatorial plane EP. The second set 50 has substantially parallel lugs 44 extending from the second tread edge 32 toward the equatorial plane EP. The second set 50 of lugs 44 are angularly inclined similar to but opposite in hand relative to the first set 48 of lugs 44.

The preferred embodiment tire of FIG. 5A has at least two design cycle lengths, including a small length (S) and a large length (L). The variation in design cycle length from small to large is at least 1.1. The design cycles extend from either a first or the second tread edge to the equatorial plane. Each lug of one set is circumferentially offset by at least one half a design cycle relative to the circumferentially adjacent lugs of the opposite set. Each lug 44 has a radially outer surface 56, the surface 56 being bounded by a leading edge 52, a trailing edge 54, an axially outer end 45 and an axially inner end 46. The average distance between the leading and trailing edges defines the radial outer lug width (W). The width (W) of each lug 44 is proportional to the design cycle length S, M or L encompassing a majority of the radially outer surface 56 of the lug 44. Preferably at least 80% of the radial outer surface 56 of each lug 44 is located within one design cycle S, M or L. Each design cycle S, M or L has a leading boundary line 60 and trailing boundary line 62. Between the leading and trailing boundary lines 60,62 establishes a circumferential space 64. This circumferential space defines a design cycle. The leading and trailing boundary lines are preferably parallel to either the leading 52 or trailing edge 54 of a lug 44 over 80% of the lugs' length. More preferably, the boundary lines 60,62 are coincident with the respective leading or trailing edge 52,54 of the lugs as shown in FIG. 5A. Alternatively, the boundary lines 60,62 can be spaced between a leading edge 52 and trailing edge 54 of two circumferentially adjacent lugs 44 within a set as illustrated in FIG. 5B. This preferred tread 40 can be manufactured using unvulcanized tread rubber of circumferentially uniform cross-section. The resultant vulcanized tire 10 has a volume of lug rubber uniformly dispersed about the length of the tread due to the fact that the lug width (W) at the outer lug surface 56 is proportional to the design cycle length encompassing each lug 44. The taper angles, and the bracing radii which extend from the lug edges for blend purposes are preferably proportional. The result is that the mass of tread rubber circumferentially positioned around any quarter or 90° portion of the tire 10 is uniform within plus or minus 5%.

In the above-preferred embodiment each lug 44 extends from its respective tread edge 30,32 to beyond the equatorial plane EP and the tread 40 has three distinct design cycles, Small (S), Medium (M) and Large (L) arranged in a sequence of 19 design cycles of LLSSSSS-LLLLLLLLSSML. The pitch ratio is 20:22:25 and wherein the variation from Small(S) to Large (L) design cycles is at least 1.1, preferably between 1.1 and 2.0 more preferably about 1.25. The preferred tire has a size 650/75 R32 and a net-to-gross ratio of less than 35%, preferably about 25%.

Definitions

"Aspect Ratio" means the ratio of its section height (SH) to its section width (SW).

"Axial" and "axially" means the lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt reinforcing structure" means at least two annular layers or plies of parallel cords, woven or unwoven, underlying the tread, unanchored to the bead, and having both left and right cord angles in the range from 17° to 27° with respect to the equatorial plane of the tire.

"Bias ply" means a tire having bias angled carcass, the angle of the cords being about 25° to 50° relative to the equatorial plane of the tire. Each adjacent ply has cords equal but oppositely oriented.

"Carcass" means the tire structure apart from the belt structure, tread, undertread, and sidewall rubber over the plies, but including the beads.

"Casing" means the tire structure apart from the tread and undertread, but including the sidewalls.

"Circumferential" means lines or directions extending along the perimeter of the surface of the annular tread perpendicular to the axial direction.

"Design rim" means a rim having a specified configuration and width.

"Design rim width" is the specific commercially available rim width assigned to each tire size and typically is between 75 and 90% of the specific tire's section width.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the center of the tire and "outer" means toward its exterior.

"Leading" refers to a portion or part of the tread that contacts the ground first, with respect to a series of such parts or portions, during rotation of the tire in the preferred direction.

"Net-to-gross ratio" means the ratio of the tire tread rubber that makes contact with a hard flat surface, divided by the area of the tread located between the lateral edges including non-contacting portions such as grooves as measured 360° circumferentially about the tire when the tire is inflated and under normal load conditions.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Ply" means a continuous layer of rubber-coated parallel cords.

"Radial" and "radially" mean directions radially toward or away from the axis of rotation of the tire.

"Radial ply tire" means a belted or circumferentially-restricted pneumatic tire in which the ply cords which extend from bead to bead are laid at cord angles between 65° and 90° with respect to the equatorial plane of the tire.

"Section Height" (SH) means the radial distance from the nominal rim diameter to the outer diameter of the tire at its equatorial plane.

"Section Width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

BRIEF DESCRIPTION OF THE DRAWINGS

FIG. 4 shows the tread contour of the tire 10 illustrated in FIG. 1 having three distinct design cycles Small (S), Medium (M) and Large (L).

FIG. 5A is a view of a portion of the tire tread contour of the preferred embodiment having pitch boundaries contoured to an edge of a tread lug and coincident with a leading or trailing edge of a lug.

FIG. 5B is an alternative tread having long and short lugs with the pitch boundary circumferentially spaced between lugs.

FIG. 6 depicts a portion of the tread contour of a tire wherein all lugs cross the equatorial plane and the tread had two distinct design cycles Small (S) and Large (L).

FIG. 7 depicts a portion of the tread contour of a tire having four design cycles S, $M_1$, $M_2$ and L and wherein the lugs do not extend past the equatorial plane.

DETAILED DESCRIPTION OF THE INVENTION

With particular reference now to FIGS. 1–3 and 5A, a preferred embodiment of the pneumatic agricultural tire 10 made according to the present invention is illustrated.

Figure 3:
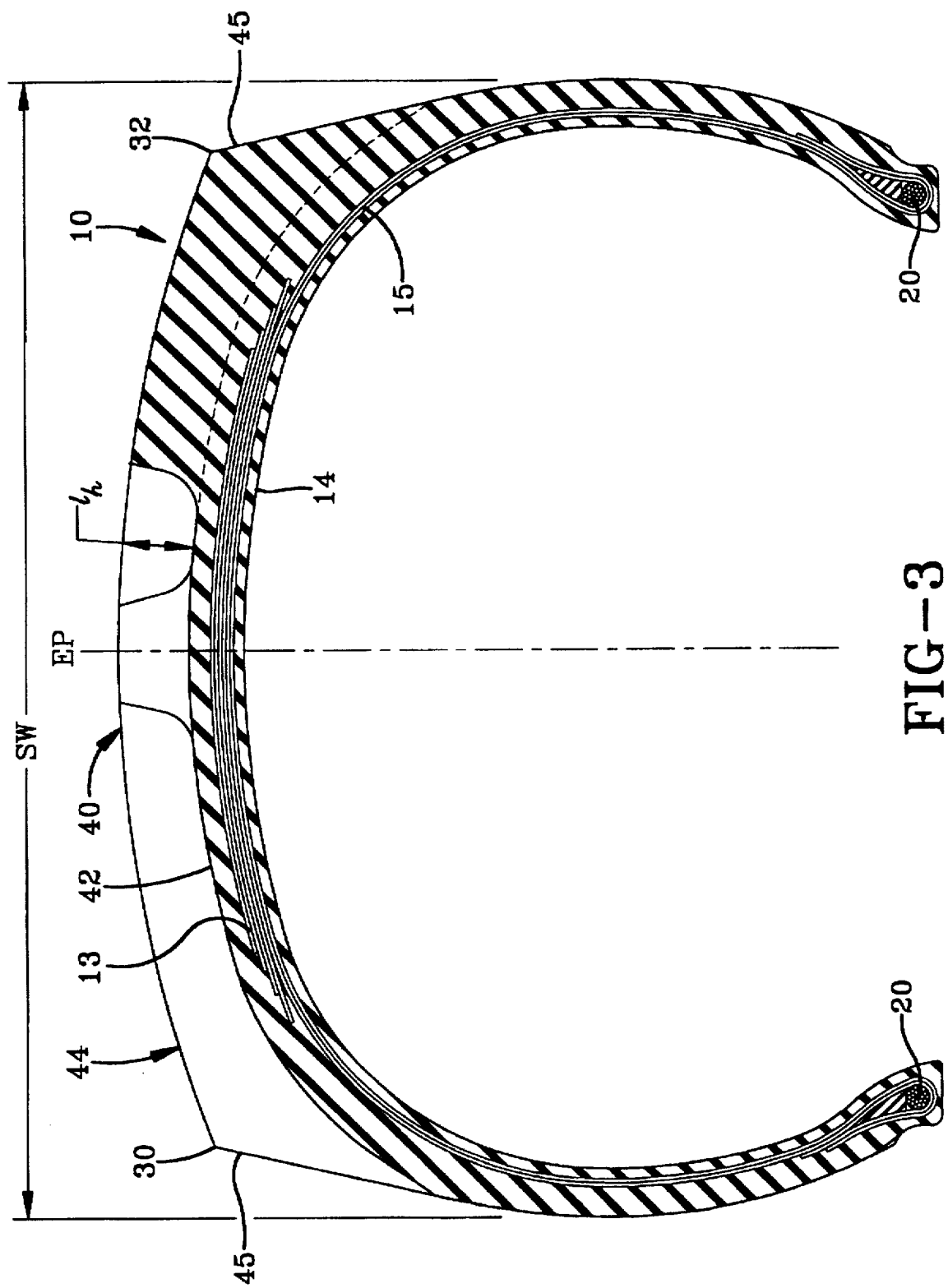
FIG. 3 is a cross-sectional view of the tire 10 of FIG. 1.

The illustrated tire 10 has a nominal rim diameter (D) of 32 inches (81 cm). Alteratively, the diameter can be of any size suitable for agricultural use such as 38 inches (97 cm). The tire 10 has an axis of rotation R, an equatorial plane (EP) and a maximum section width (SW). The tire 10 has a casing 12. The casing 12 includes a cord reinforced rubber-coated carcass 14 and a pair of beads 20,20'. The carcass 14 as illustrated in FIG. 3 has two radial plies 15 extending from bead 20 to bead 20' and a belt reinforcement structure including four belt plies 13 radially outward of the plies. The tire 10 has a tread 40 disposed radially outwardly of the casing 12. The preferred tire has a load index of 167 and has four radial carcass plies 15 and four belt plies 13. Any number of belt plies or carcass plies may be employed dependant on the service conditions required.

Figure 1:
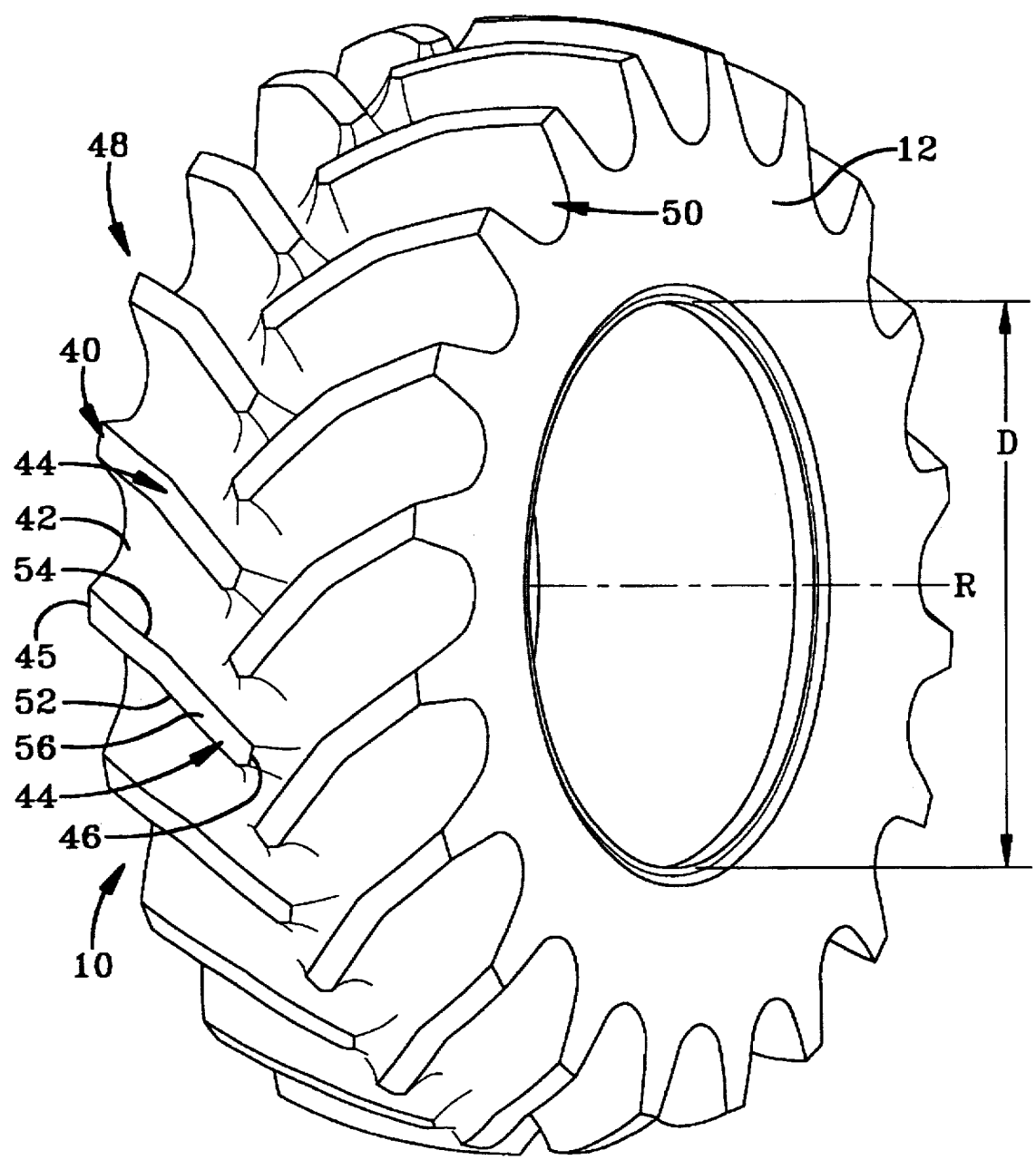
FIG. 1 illustrates a perspective view of a preferred embodiment agricultural tire 10 made in accordance with the present invention.
Figure 2:
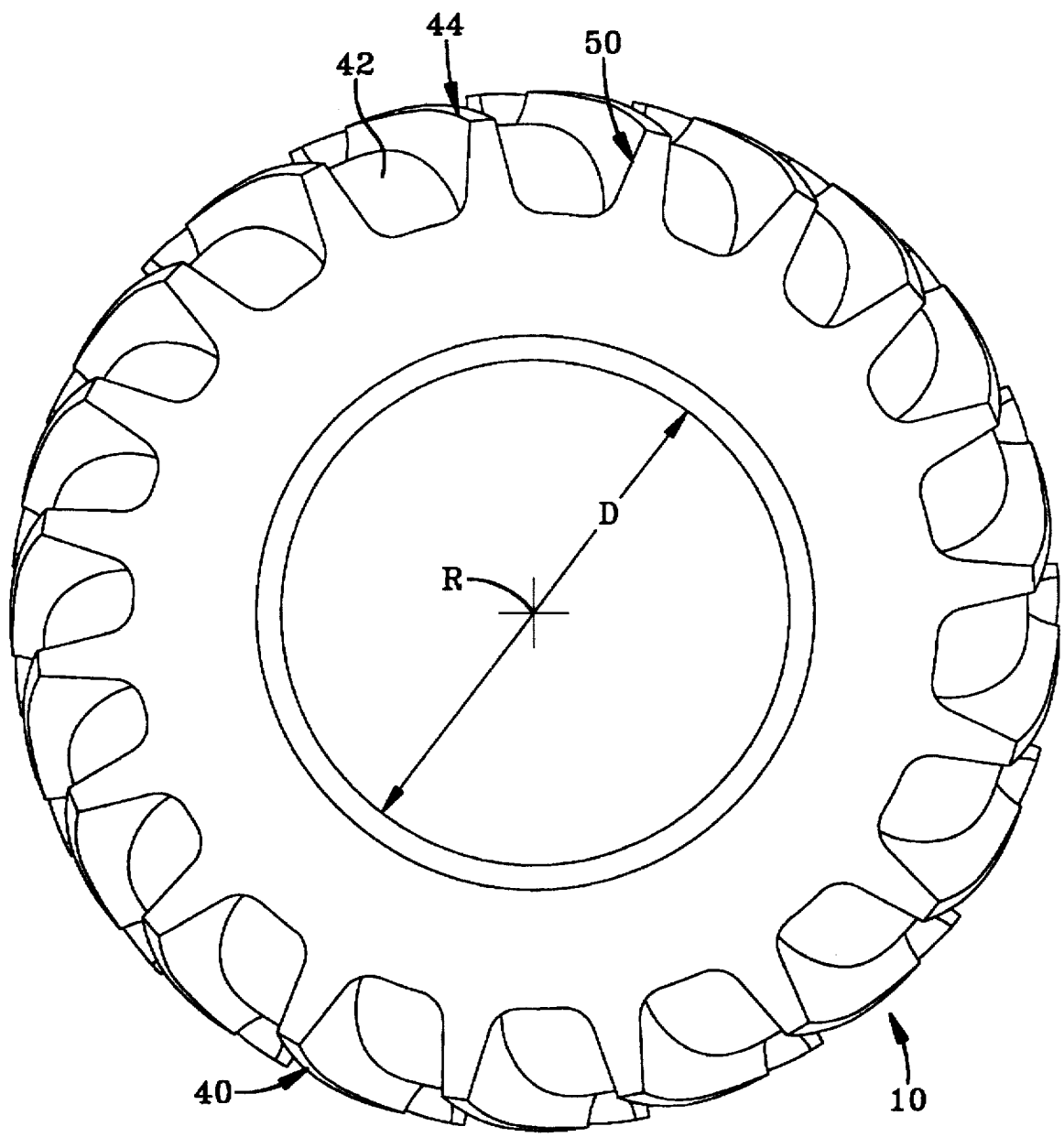
FIG. 2 is side view portion of the tire 10 illustrated in FIG. 1.

The illustrated preferred tread 40 of FIG. 1 includes an inner tread 42 and tread lugs 44 of a depth of about the 1.35 times R1 depth. The depth R1 is defined as an industry standard as described by the Tire and Rim Association, Inc., as a regular or conventional depth. The typical R1 depth is about 1.52 inches or 3.9 cm deep for the 650/75 R32 size tire illustrated in FIG. 1. The tire (10) having a lug height ($l_h$) of 1.35 R1 means that the lug is effectively taller than a conventional R1 lugged tire of similar size. This means that fewer lugs 44 can be added around the circumference of the tire (10) while maintaining the lug spacing sufficiently open to ensure that the tread does not pack with mud. Fewer lugs 44 means that the noise, vibration, and ride handling problems are exaggerated, making a solution to these problems of utmost importance if the tire 10 is to be acceptable to the operators of the tractors, combines or like vehicles. The greater depth of the lugs means that the tire should exhibit excellent traction. The inventors' novel pitching solution make the use of such a tire feasible.

The preferred embodiment tire 10 as illustrated in FIG. 1 has 38 lugs 44 extending between greater than 45% to 60% of the tire's maximum section width (SW) between an axially outer end 45 and an axially inner end 46.

The lugs 44 are divided into a first set 48 and a second set 50, each set extending from an opposite side of the tire 10. The first set of lugs 19 are circumferentially spaced about the tread 40. Each lug 44 has a leading edge 52 and a trailing edge 54. The second set 50 of lugs 44 are similar to but opposite in hand from the first set 48.

Figure 4:
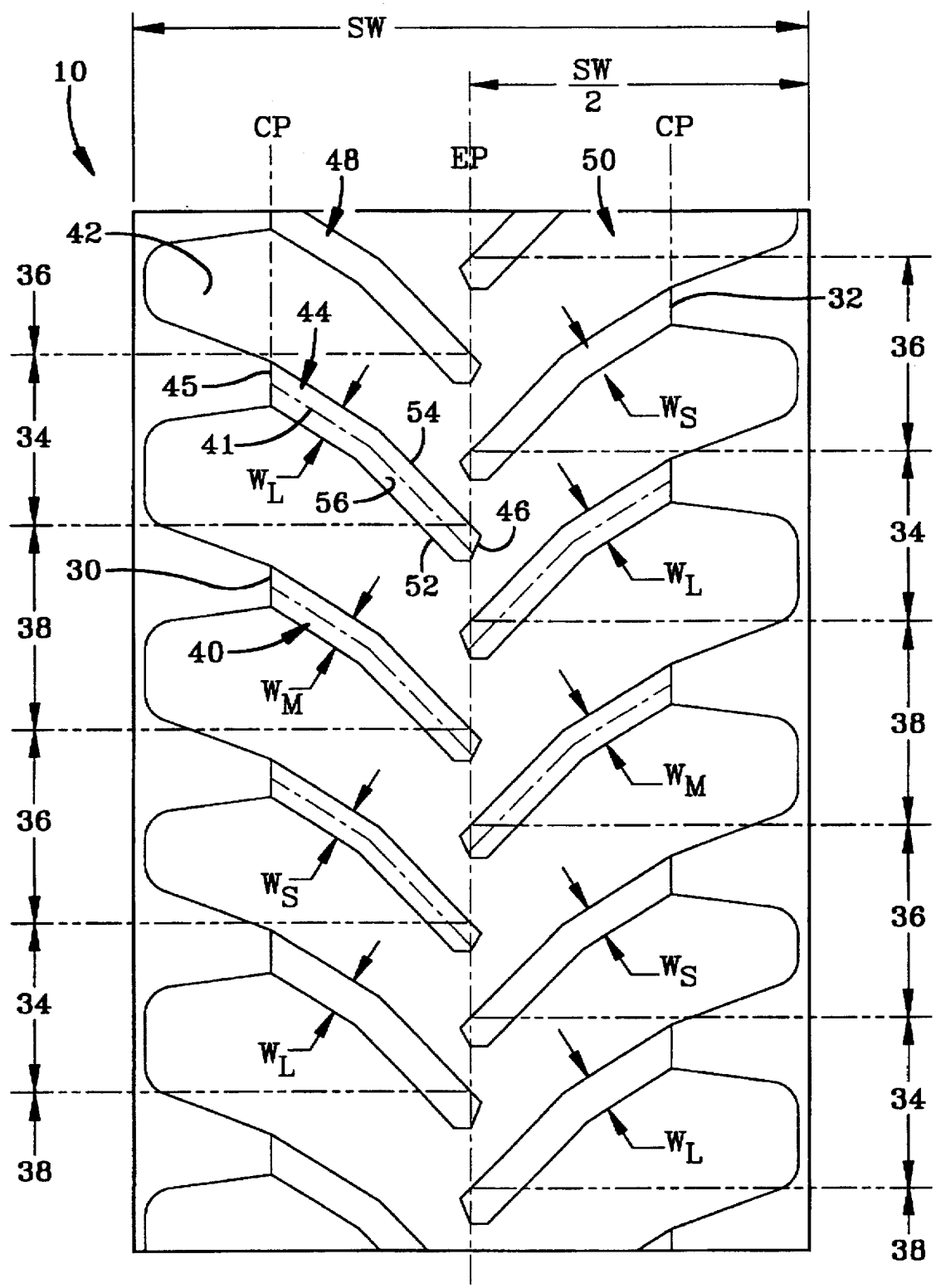
FIGS. 4, 5A, 5B, 6 and 7, illustrate views taken from the contours of a portion of the tread of tires.
Figure 5A:
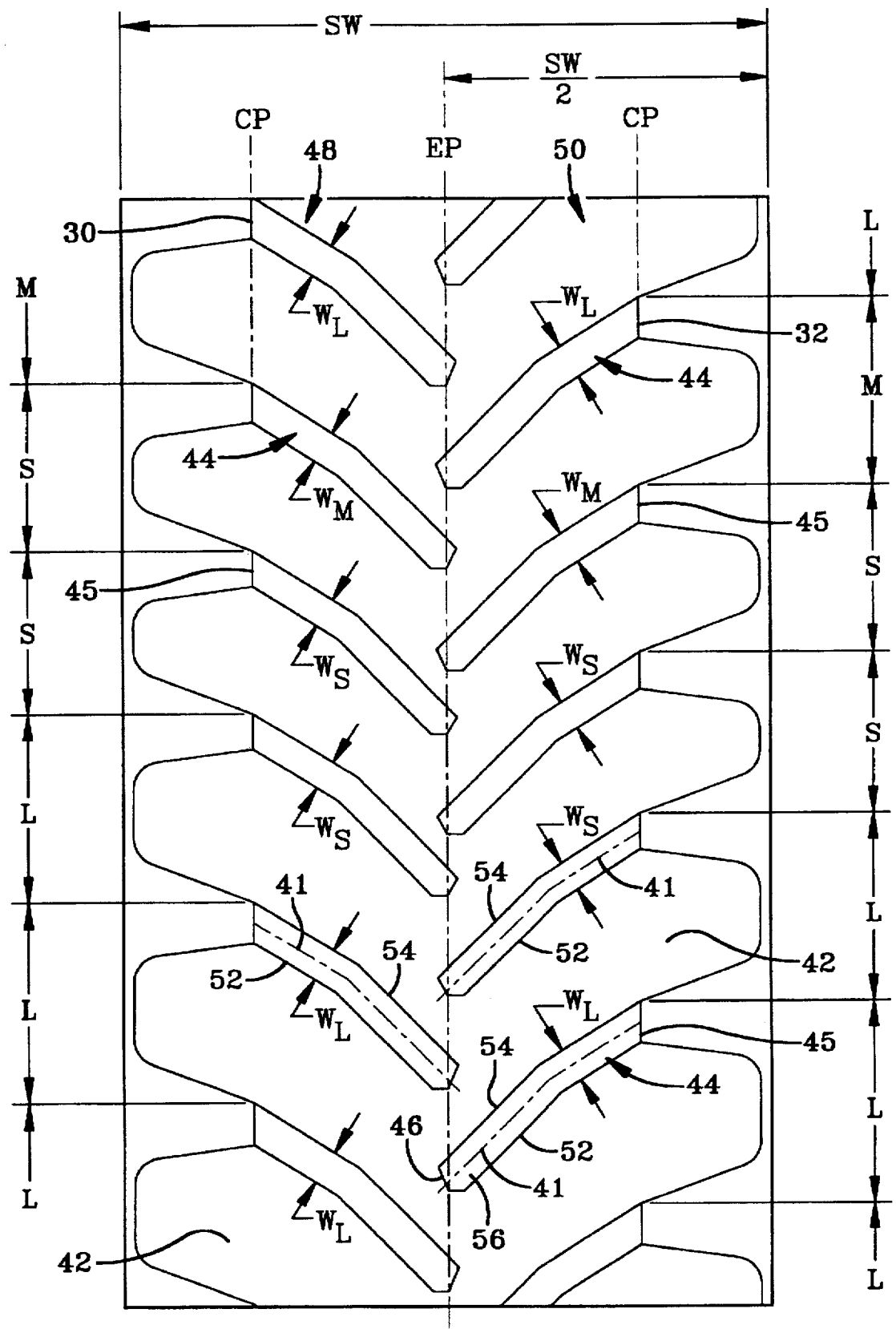
Figure 5B:
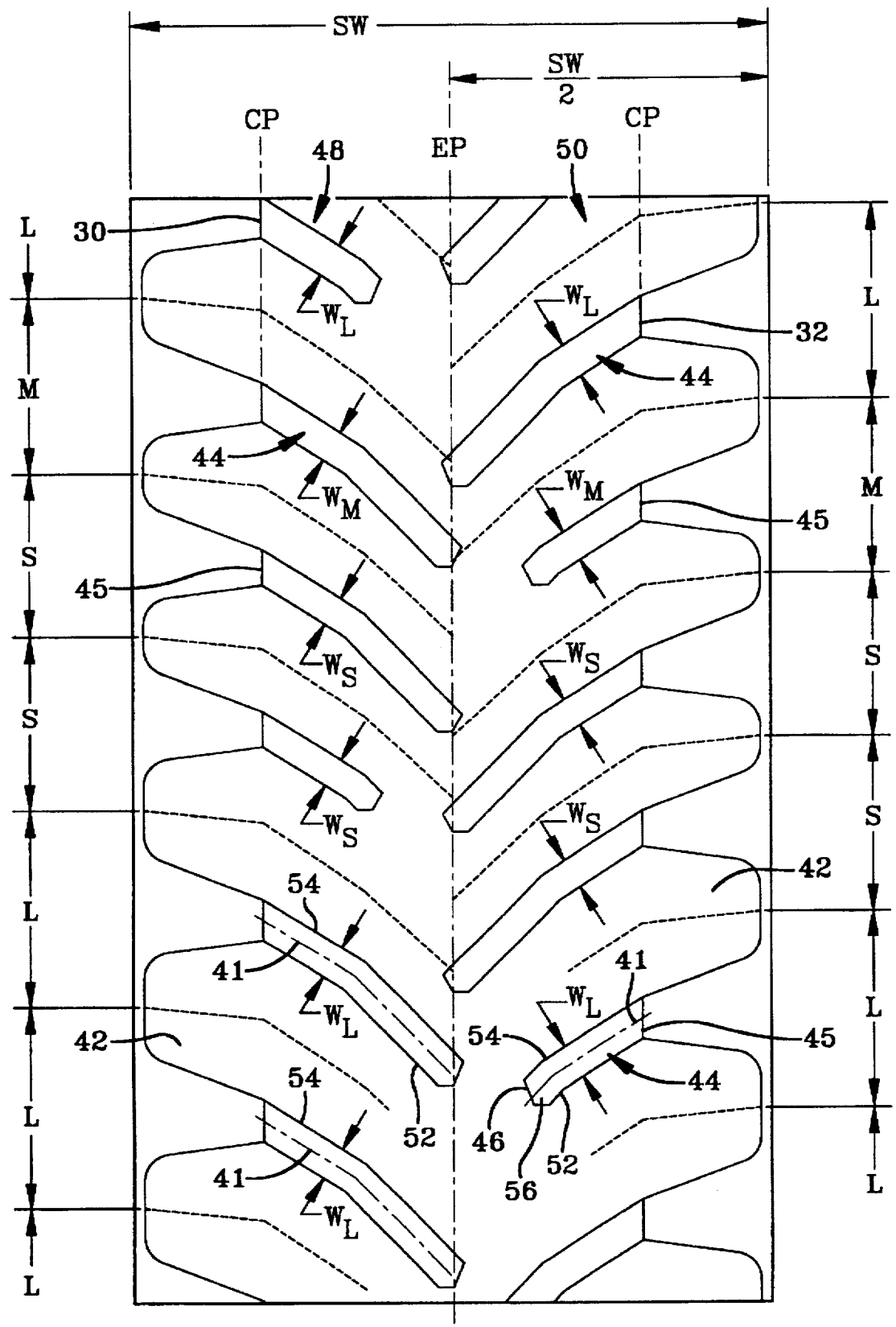
Figure 7:
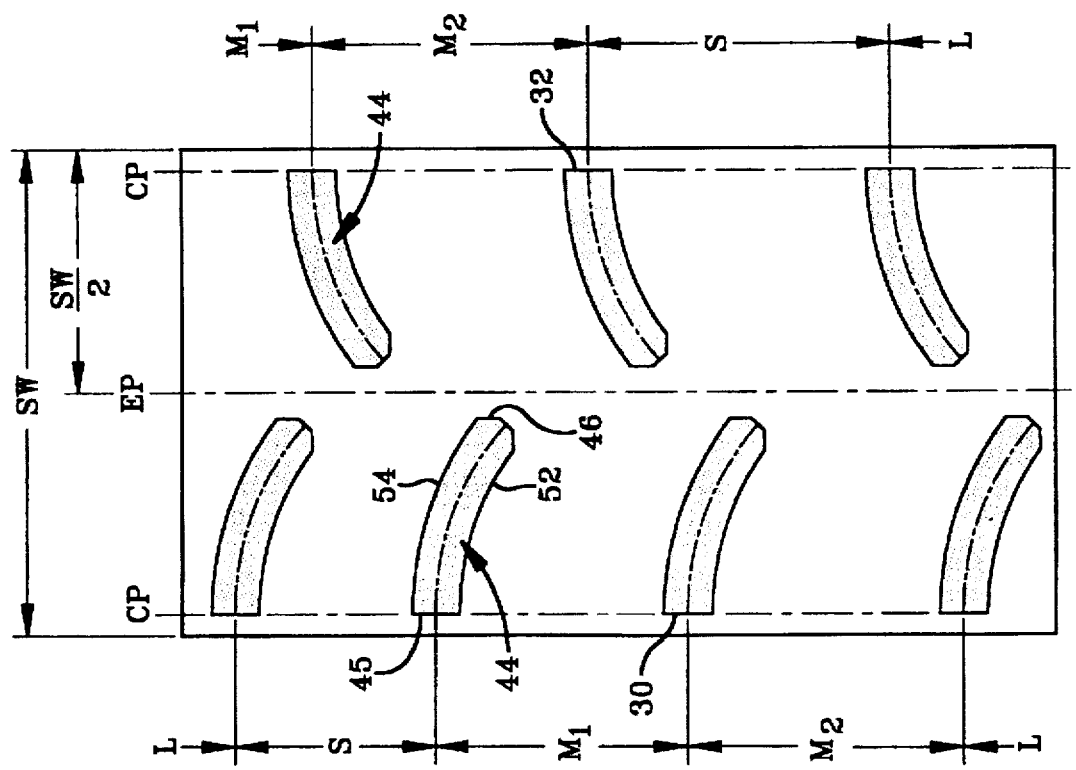
Figure 6:
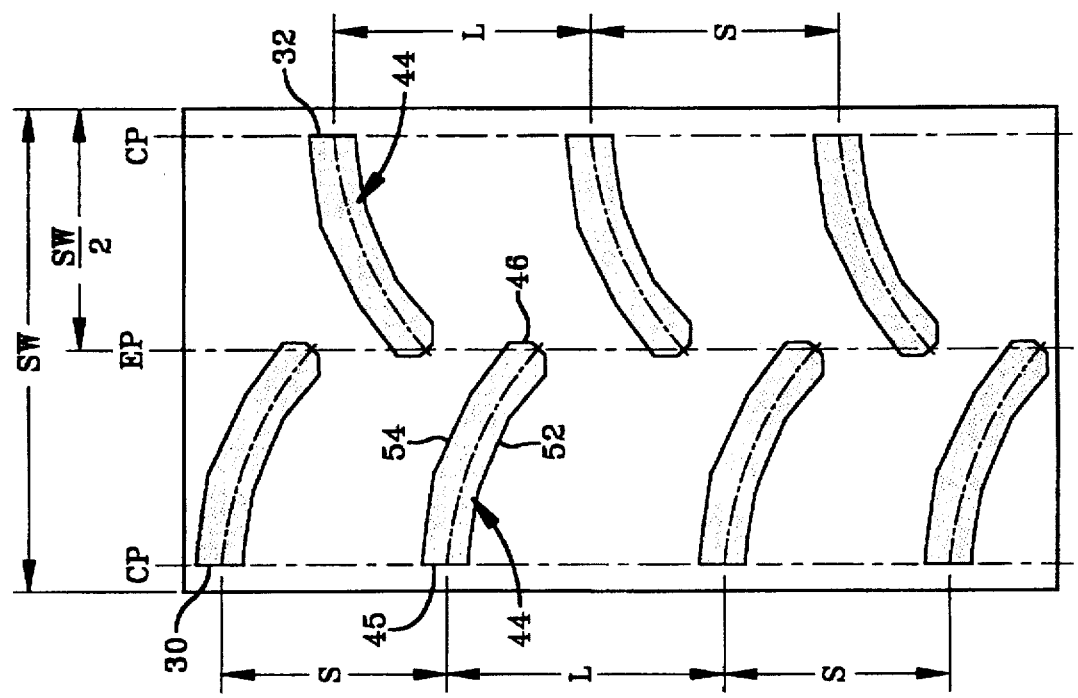

As illustrated in FIGS. 4–5B a tire according to the present invention can be designed with a variety of lug spacings. The preferred embodiment employs three design cycles, S, M, L. Alternatively, tires having two design cycles S, L can be employed as shown in FIG. 6. Also, as shown in FIG. 7 a pattern of four design cycles S, $M_1$, $M_2$ and L can be used. One advantage of employing variable or distinct spacings is that the tread design pattern can employ substantially parallel long lugs while maintaining a sufficient spacing of the lugs at the center of the tread to insure that the tire 10 does not pack with mud and the lugs do not have a serious deformation problem under high torque or high loads.

In the illustrated views the circumferential distance between the pitch boundaries 60,62 define the pitch or design cycle length S, M or L. For ease of measurement these lengths are shown at a plane CP, the plane CP located at each respective tread edge 30,32. The tread edges 30,32 are defined as the location where the radially outer surface 56 of the lug 44 intersects the axially outer end 45 of the lug 44. Generally, these locations are aligned about the tread. In applications where the outer ends of adjacent lugs are not aligned the plane CP can be determined by simply picking a fixed distance axially outward relative to the equatorial plane such as 75% of the section width of the tire. The selection of the plane CP can be somewhat arbitrary in that it is only the relative spacing of the lugs around the tread that is of importance.

It is believed that when employing two distinct design cycles consisting of S, L lengths the number of lugs 44 should be equal in both the first and second sets 48,50.

When employing three distinct design cycles S, M, and L it is believed that the number of lugs 44 within each set 48,50 should be equal and range from 15 to 24 lugs per set.

When employing four design cycles S, $M_1$, $M_2$ and L it is believed preferable to have equal numbers of lugs 44 in each set 48,50 and that the number of lugs range from 15 to 24 per set.

Figure 8:
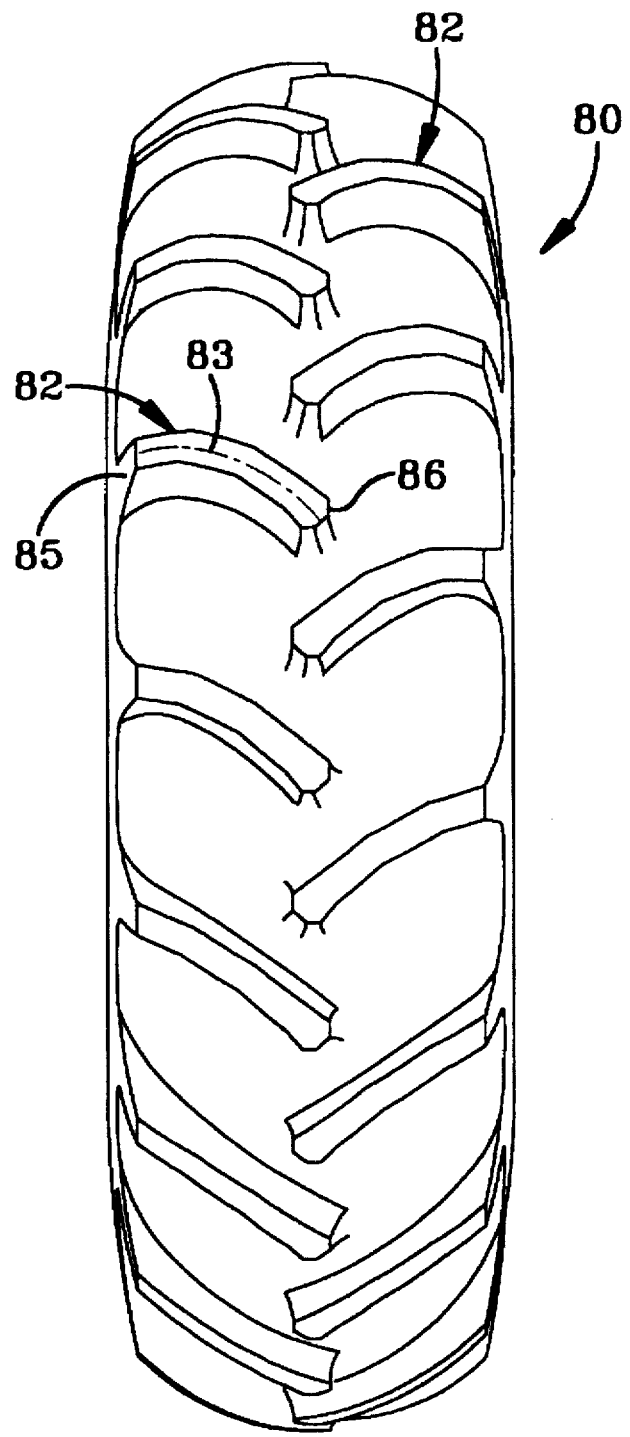
FIG. 8 depicts a plan view of a prior art bias agricultural tire.
Figure 9:
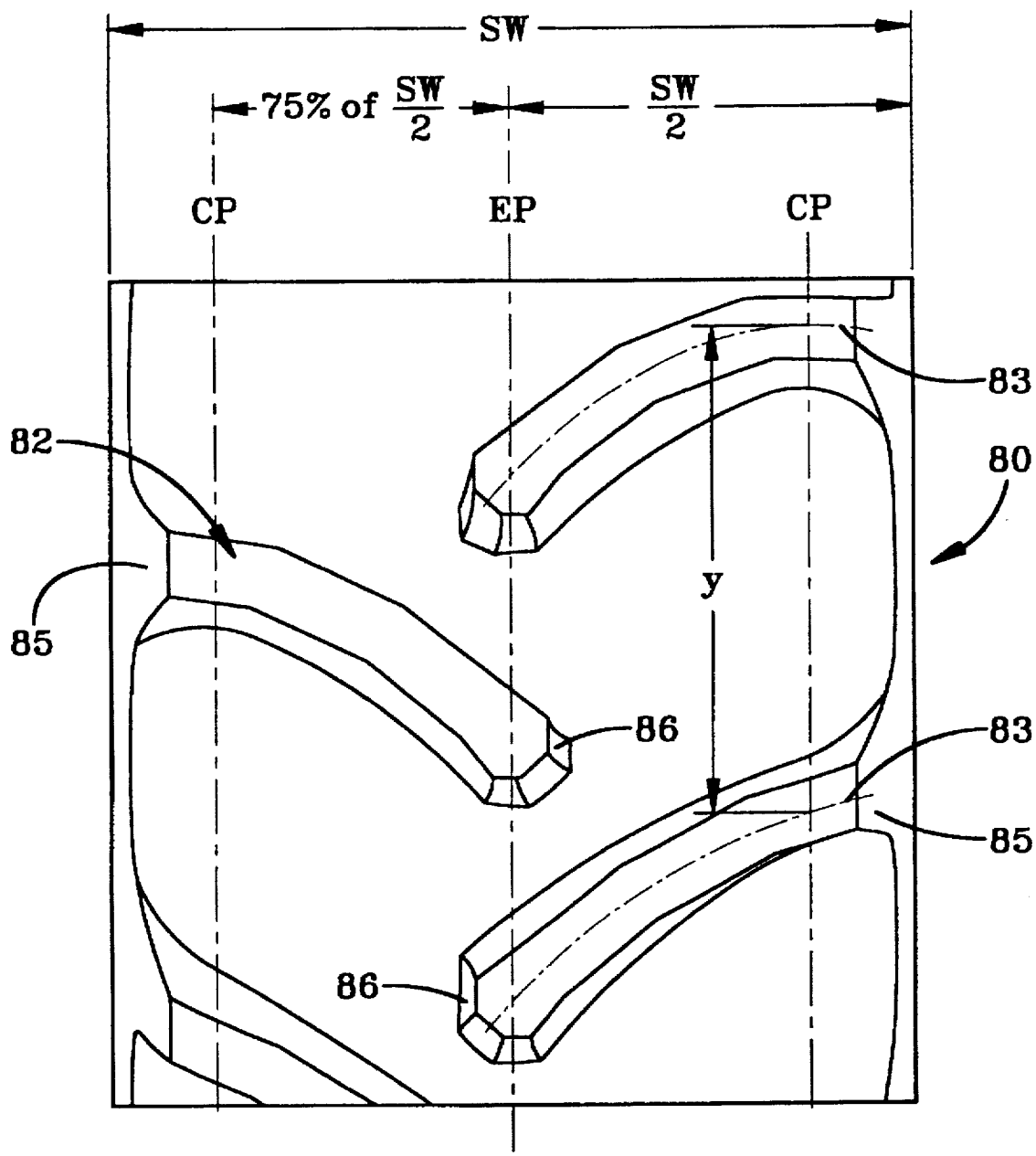
FIG. 9 is an enlarged fragmentary view of the prior art tire of FIG. 8.

As illustrated in FIGS. 4–7 the lugs may be of various shapes such as, but not limited to, straight, curved or multi-angled polygons. Furthermore, they can all extend inwardly not crossing the equatorial plane as in FIGS. 7, or can all cross the equatorial plane as in FIGS. 4, 5A and 6. The conventional practice in the farm tire art was to employ evenly or uniformly spaced tread lugs. That is to say the tread lugs had a single spacing circumferentially. FIGS. 8 and 9 depict a prior art tire 80. As shown in FIG. 9 the tire 80 has a plurality of tread lugs 82 generally evenly and uniformly spaced a distance y between tread lug centerlines 83. The lugs 82 extended from an axially outer end 85 to an axially inner end 86. The lugs 82 all cross the equatorial plane EP. The generally accepted practice to achieve cost efficiency led the tire engineers to develop tires having fewer and fewer lugs. The illustrated tire 80, for example, depicts a Goodyear Traction Irrigation tire which employs 32 lugs 82.

In the preferred embodiment as illustrated in FIG. 5A the width (W) of each lug 44 as measured at the radially outer surface 56 of the lug 44 perpendicular to the centerline 41 of the lug 44 is a constant over 90% of the length of the lug 44 between the axially inner end 46 and the intersection of the axially outer end 45 and the radially outer surface 56. The width (W) is preferably less than the radial height $l_h$ of the lug 44. The noise reducing and vibration eliminating enlarged lug heads commonly employed in rear tractor tires can be avoided. In the illustrated preferred embodiment, the axially inner portion of the lug is preferably not any thicker than the width (W) of the lug 44. This helps reduce the mud packing at the center of the tire.

Referring to FIG. 6, a portion of the tire tread contour is shown, the tire having a 19 pitch sequence optimized for the exemplary 650/75 R32 STR tire shown in FIG. 1. The pitch sequence shown exhibits two design cycle length small (S) and one large (L), arranged as follows: LSSSSSSSSSS-LLLLLLLL. The large design cycle has a normalized length of 110 when the small design cycle was normalized to 100. In other words, the above sequence was optimized with a 1.1 variation between the large and small design cycles. Of the nineteen design cycles, 10 were small, 9 were large.

Analysis of the two design cycle agriculture tires as described above and illustrated in FIG. 6 resulted in a predicted 30% reduction in the first pitching harmonic when compared with the same tire 10 having the conventional single or uniform pitch. It was observed that due to the fact that all small and large design cycles were grouped together a problem of mass unbalance was observed.

In order to correct the mass unbalance concern, a 19 pitch sequence employing three design cycle lengths, small (S), medium (M) and large (L) was attempted on the same 650/75 R32 STR type tire as shown in FIG. 1. The optimized pitch sequence was as follows: LLSSSSS-LLLLLLLLSSML. A portion of this sequence is depicted in the tread portion of FIGS. 4, 5A and 5B. The tread 40 as shown in FIG. 4 is divided into a plurality of circumferentially repeating design cycles 34,36,38, the design cycles having a total of at least two different design cycle lengths, including a short length (S) and a large length (L). In the embodiment of FIG. 4, the design cycles extend parallel to the axis of rotation from the first tread edge 30 or the second tread edge 32 to the equatorial centerplane. The lugs 44 of the first and second sets 48,50 respectively circumferentially extend across two or more circumferentially adjacent design cycles 34,36,38 each lug 44 of one set 48,50 lying within two or more design cycles and being circumferentially offset by at least one-half a design cycle relative to the circumferentially adjacent lugs 44 of the opposite set.

To further reduce the mass imbalance problems it was determined that the width (W) of each lug 44 should be made proportional to the design cycle length S, M or L in which a majority of the radially outer surface 56 of the lug 44 lies. As shown in FIGS. 5A and 5B, 80% of the radially outer surface 56 of each lug 44 is located preferably within one design cycle. Each design cycle S, M or L has a leading boundary line 60 and a trailing boundary line 62. The circumferential space between the leading and trailing boundary lines 60,62 defines one design cycle. These leading and trailing boundary lines are preferably parallel to either the leading 52 or trailing edge 54 of a lug 44, as shown in FIG. 5A the trailing edges 54 and the boundary lines 60,62 are coincident. The leading boundary line 60 of a design cycle is also coincident with the trailing boundary line 62 of a circumferentially adjacent design cycle. Therefore, as illustrated reference numerals 60,62 are shown together in FIGS. 5A and 5B. Alternatively as shown in FIG. 5B the boundary lines can be circumferentially spaced between two circumferentially adjacent lugs 44 within a set 48, or 50.

When the lugs are of uniform length, shape, and proportional in lug width (W) relative to design cycle length means that the mass of tread rubber can be more uniformly distributed around the tire 10. The mold having lug width $W_S$, $W_M$, $W_L$ proportional to the length of the design cycle insures that the volume or mass of tread rubber is substantially uniform about the tread. It is believed possible to have the tread pitched using two or more design cycle lengths and have a tread that is uniform within plus or minus 5% by weight in any quarter or 90° section of the tire 10. This uniformity greatly reduces the mass unbalance problems observed in the first two cycle pitched tire as shown in FIG. 6.

When designing a pitched tractor tire as described above the designers fixed the maximum and minimum width of the lugs so as to have sufficient stiffness and load bearing capacity while avoiding crushing or severe deformation of the lugs. The preferred invention tire of FIG. 5A had a minimum lug thickness of 44 mm. The maximum lug width (W) was chosen to be 1.25 the minimum lug width. The inventors then chose 19 lugs 44 per set 48,50. The sequence was calculated establishing the number of large, small and medium pitches or design cycles. They then summed up and calculated the radial angle for an S, M or L design cycle thus establishing the pitch length at the outside diameter of the tire. The sum of pitch length angles naturally equalling 360°.

The designers then starting at one point of the circumference position one lug 44 and then sequentially position the other lugs 44 on one half of the tread thus developing a complete set 48 or 50 of lugs 44.

Figure 10A:
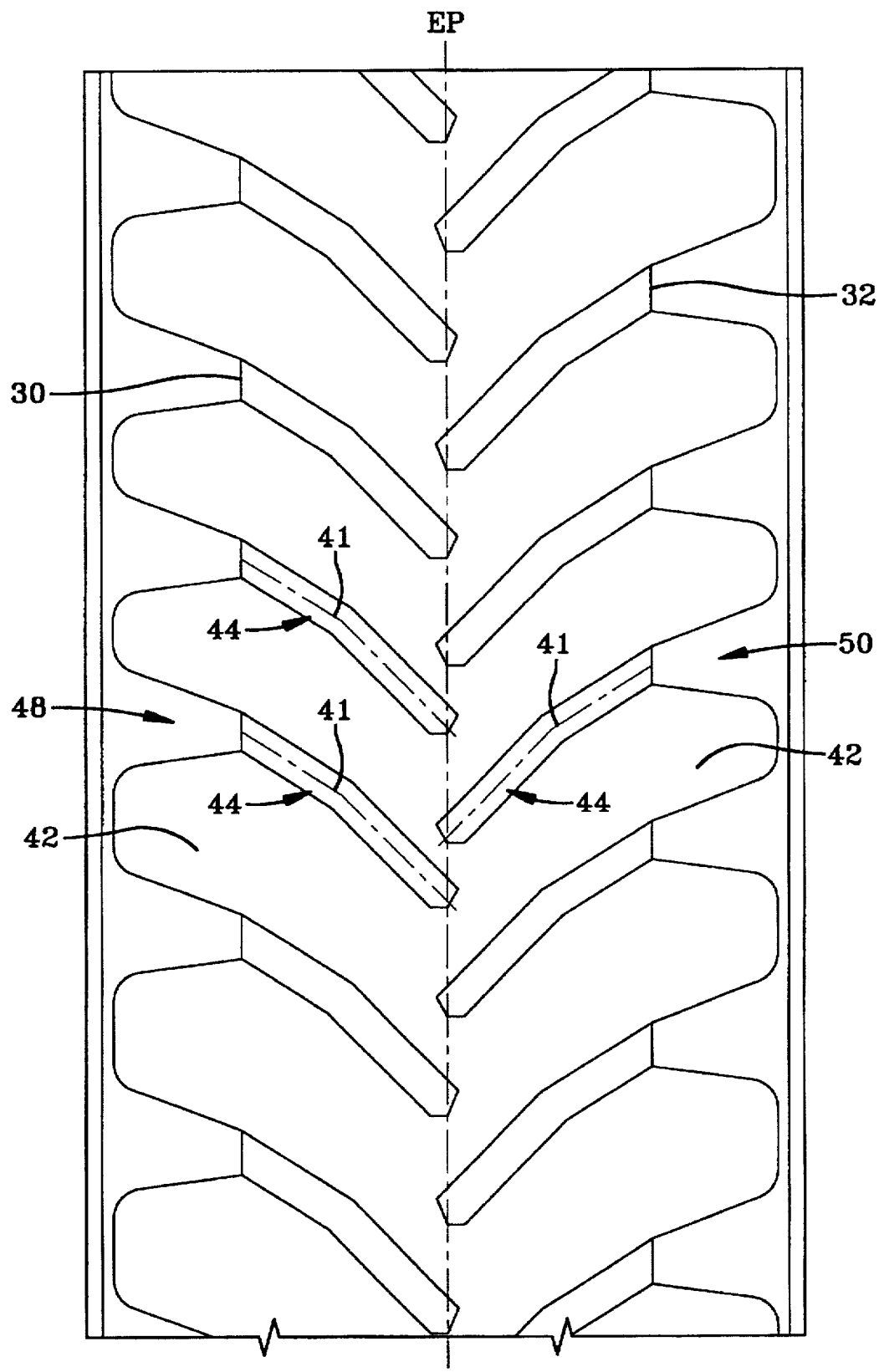
FIGS. 10A, 10B and 10C illustrate the entire three design length pitch sequence.
Figure 10B:
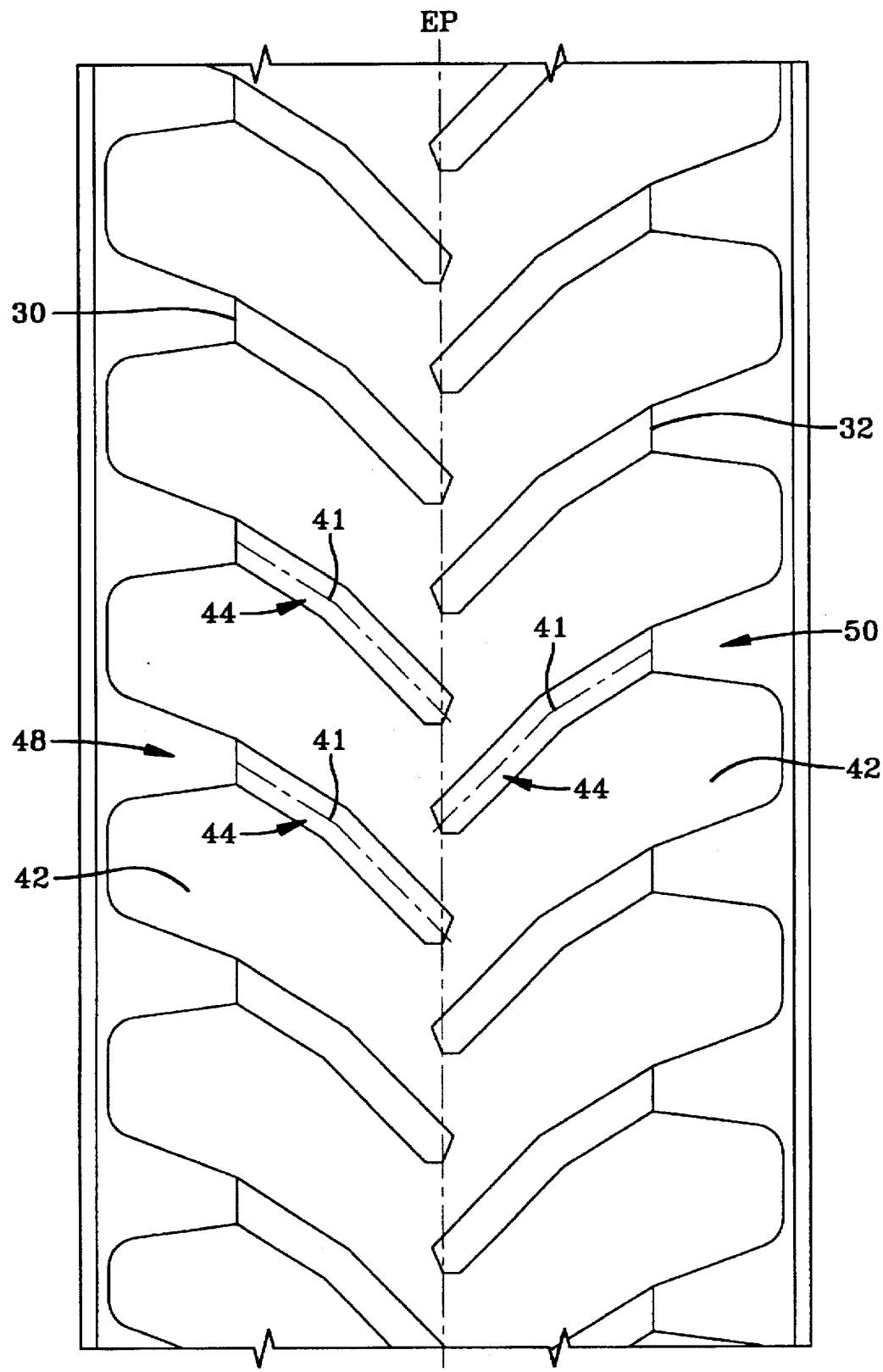
Figure 10C:
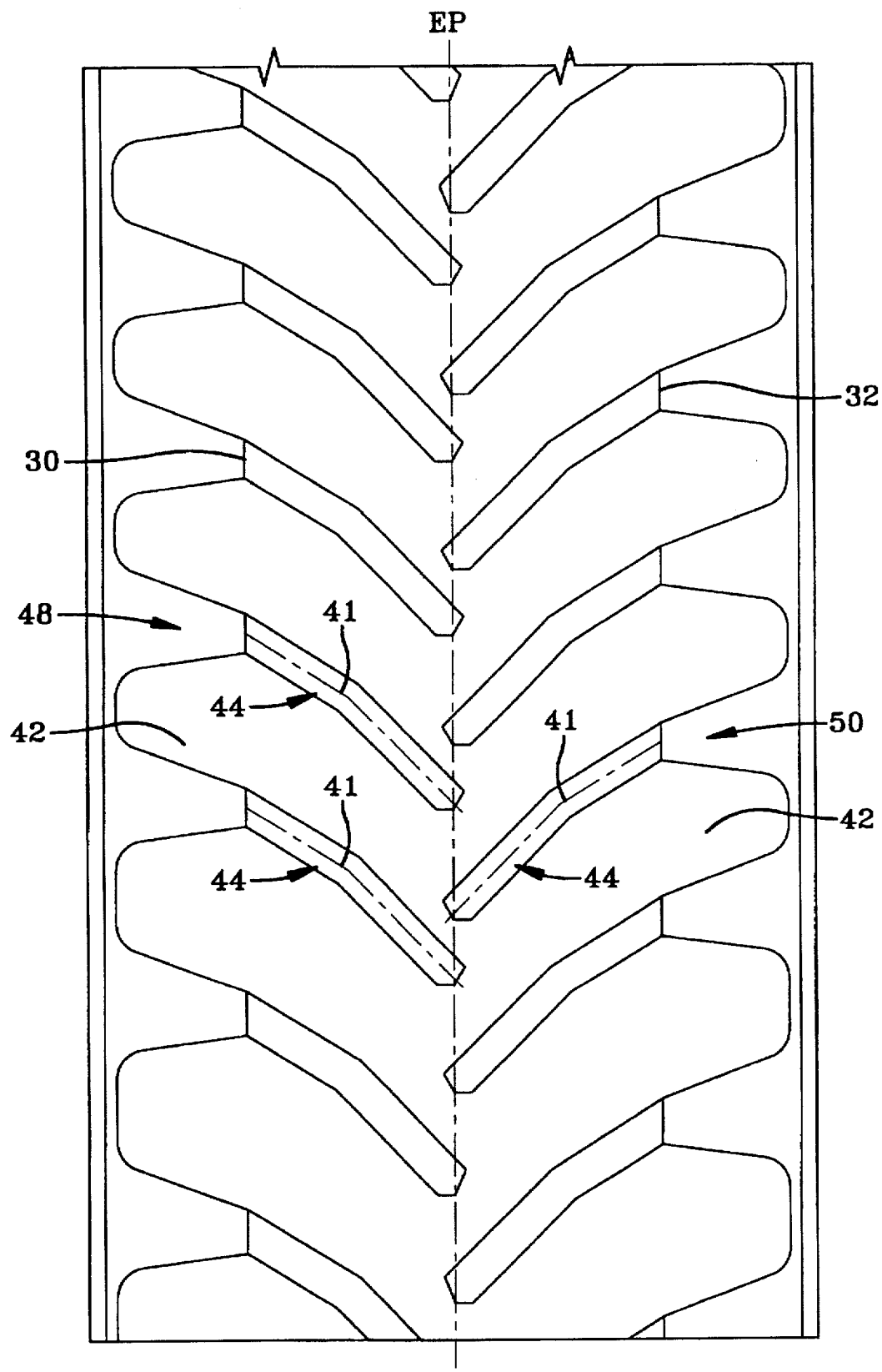

Then the opposite half of the tread pattern is formed using the same sequence and is offset by one half a pitch length as shown in FIGS. 10A, 10B and 10C. One will readily observe that the axially inner ends 46 of lugs 44 of one set are not uniformly spaced relative to the lugs 44 of the opposite set.

The inventors observing this phenomena noted that this problem occurs when the design cycle length changes from L to S, L to M, S to L, S to M, M to S or M to L. This is because the lugs of the opposite half can be overlapping two different circumferential design cycle distances. In the case of a lug 44 which straddles two design lengths of ½ S and ½ L, the lug 44 being in a design cycle of either S or L means that the lug will not be centered. The design cycle size transition points can be corrected if the lug is shifted ½(L/2+S/2). This centers the lug 44. Accordingly, as a final design step the designer may choose to correct the last developed set 48,50 of lugs 44 at these transition areas where the design cycle length changes.

Figure 11A:
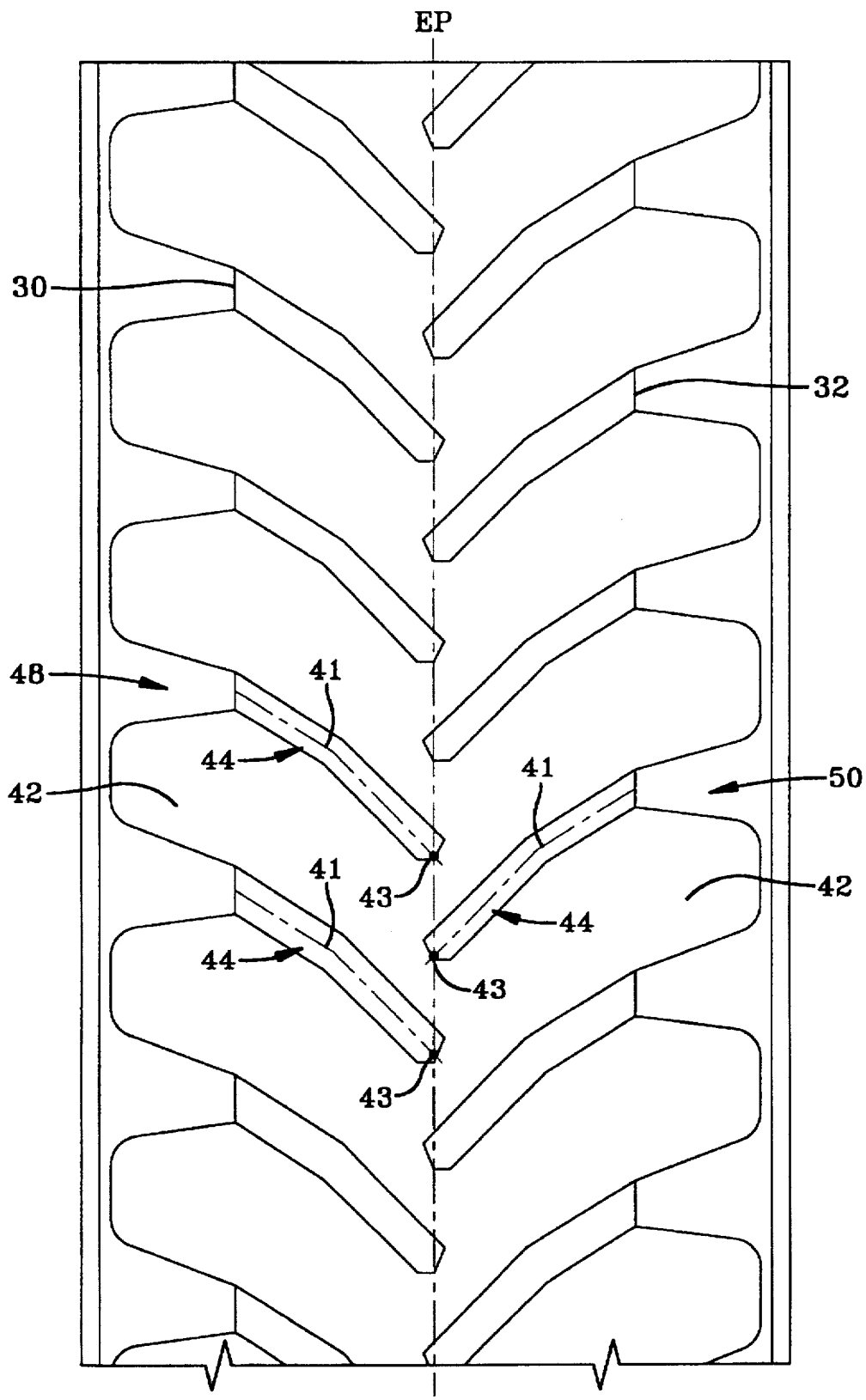
FIGS. 11A, 11B and 11C show the entire three design length pitch sequence having the centerlines of set 50 adjusted relative to set 48 to achieve equidistant spacing between centerlines of adjacent lugs.
Figure 11B:
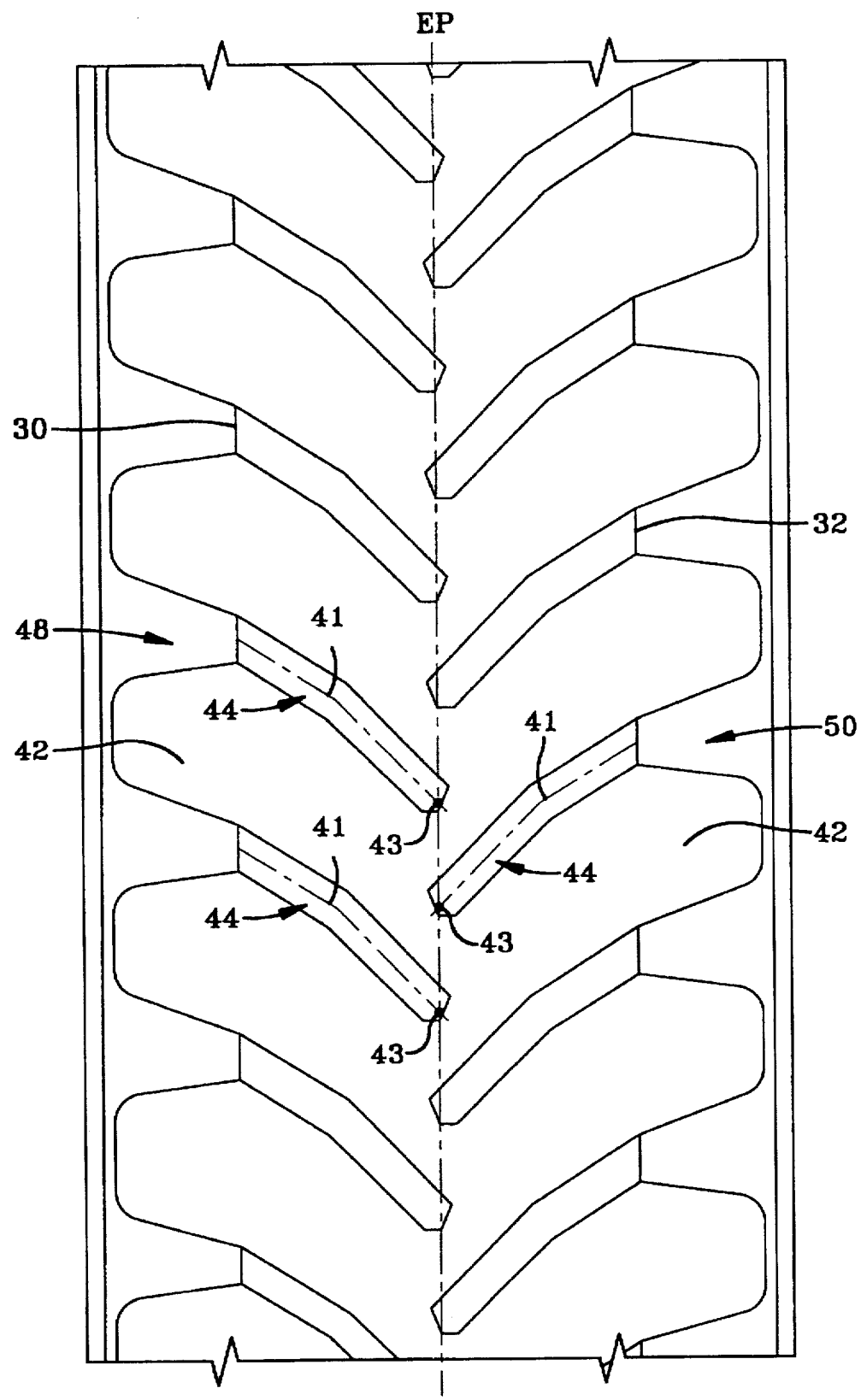
Figure 11C:
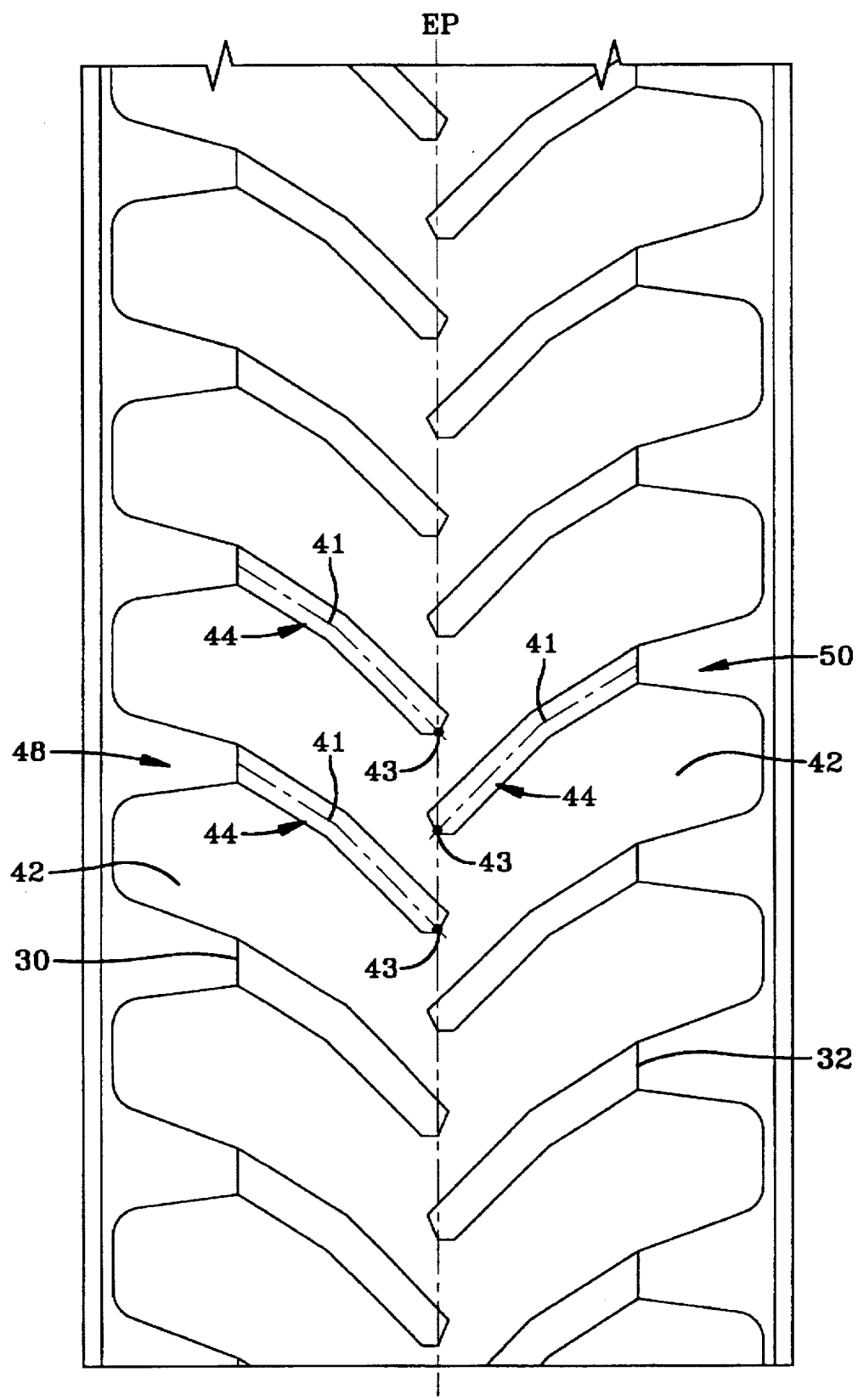

Alternatively, the designer can develop the first set 48 of lugs 44 according to the preferred pitch sequence. Then, he can find the intersection of each centerline 41 of lugs 44 with the equatorial plane EP. By locating the midpoint between the adjacent lugs centerlines 41. The designer has established the precise point 43 the centerlines 41 should intersect the EP for the lugs 44 of the set 50. The designer then simply extends the point 43 axially outwardly at the angle or angles of the lugs 44 thus forming the lug centerline 41 for each lug 44 of set 50. Then, the designer simply positions the lugs 44 relative to its respective centerline 41. The resultant pattern is as shown in FIGS. 11A, 11B and 11C. As shown, the centerline 41 of lugs 44 of set 50 are precisely centered and equidistant spaced relative to the centerlines of adjacent lugs of the opposite set 48. These adjustments are believed to greatly improve the finished appearance of the tire 10 without sacrificing the beneficial lug impact vibration reduction potential afforded by pitching the tire 10.

Testing of the three design cycle tires 10 as disclosed above resulted in a 53% reduction in the first pitching harmonic when compared to the same tire construction having the conventional single or uniform pitch. The small (S), medium (M) and large (L) design cycles had a pitch ratio of 20:22:25 respectively. When the small design length was normalized at 100, the medium design cycle length was 110, the large design cycle length was 125. The maximum variation from small to large design cycle was 1.25. This optimized three design cycle sequence reduced the energy of the first pitching harmonic responsible for vibration by 53%. It is believed that a 1.25 pitch or design cycle variation most favorably reduces the tread excitation to an acceptable level without significant mass unbalance problems. This finding is quite remarkable when one considers the tread 40 has long angularly inclined lugs 44 which extend from the tread shoulder or edge 30,32 to a location intersecting or crossing the equatorial plane EP of the tire 10. As shown in FIGS. 4, 5A, 5B, 6 and 7, the lugs 44 on one half of the tread are circumferentially offset by one-half a design cycle length from the axially adjacent and circumferentially aligned lugs 44 on the opposite tread half.

Those skilled in the art have historically believed that multiple pitching of tractor tires having a net-to-gross ratio of less than 30% provided little or no benefit at a substantially higher cost. Bias tractor tire constructions simply did not lend itself to pitching. The new radial tire constructions have a longer flatter tread footprint making pitching more practical.

The present invention permits long lugged tires as shown in FIG. 1 to be used on paved surfaces or roads at speeds up to 80 KM/hr without serious tire vibration problems.

The employment of a maximum pitch ratio variation of 1.25 was somewhat dictated by appearance and traction constraints. Alternatively, somewhat higher variations could be employed with suspected favorable vibration results at the loss of appearance and traction performance.

Alternatively, multiple design cycles of 4 or more could also be used, however they are naturally somewhat more complicated and therefore more costly.

It is also believed that the design cycle sequence from one tread half to the other should be shifted at half of one design cycle preferably precisely one-half design cycle.

Although the invention is shown employed in tractor tires having long lugs as illustrated in FIGS. 1–5A and 6, it is believed that shorter lugged tires as depicted in FIG. 7 could also benefit from a pitch variation of 1.25. Furthermore, tires having a combination of long and short lugs also may realize reduced vibration by employing the multiple pitches having a variation of about 1.25 as shown in FIG. 5B.

Another embodiment tire 10 according to the invention has an alternative pitch pattern employing the above-mentioned three different pitches S, M and L and a maximum pitch ratio equal to or greater than 1.1, preferably 1.25 has an additional constraint on the number of consecutive pitches of the same size or type. This alternative preferred sequence of pitches has the additional constraint on the number of consecutive pitches of the same type limited to two. This constraint prevents or at least greatly minimizes any perceptible tonality or vibration modulation during one tire revolution.

The level of the tread lug excitation responsible for the initial vibration problem at high frequency (20 Hz) and at speeds above 20 Km/hr; is very similar to the reductions achieved in the previous mentioned pitch sequence. The previous sequence achieved a 53% reduction whereas the second preferred sequence achieved a 49% reduction. The important distinction between the sequences being the second sequence with the constraint on the number of consecutive pitches of the same size had a dramatic improvement in the modulation of vibration amplitude and its associated noise tonality change which is related to nonuniform pitch distributions in the previous sequence which permits too many consecutive large and small pitches to be grouped together creating a less than ideal balanced pattern.

The second sequence of 19 pitches provides a balanced proportionality yielding design cycles of 6 small (S), 6 medium (M) pitches and 7 large (L) pitches. One exemplary sequence was arranged in the following sequence of design cycles LLMSSMSSLSSMLMLLMLM.

This alternative pitch pattern provides the unexpected improvements in vibration and handling with the added benefit of noise reduction.

What is claimed is:

1. An agricultural tire having a radial ply carcass, an of rotation and an annular tread radially outwardly and integrally attached to the radial ply carcass, the annular tread having a first and a second lateral edge and an equatorial plane, the equatorial plane being defined as a plane perpendicular to the axis of rotation and equidistant from the first and second lateral edge, a first and a second set of lugs, the first set having a plurality of substantially parallel lugs extending angularly from the first tread edge toward the equatorial plane, the second set having substantially parallel lugs extending from the second tread edge toward the equatorial plane, the second set of lugs being angularly inclined similar to but opposite in hand relative to the first set of lugs, the tire tread characterized by:

the tread being divided into a plurality of circumferentially repeating design cycles, the design cycles having at least two different design cycle lengths, including a small length (S) and a large length (L), the ratio of the large length to the small length being at least 1.1:1 each lug of one set being circumferentially offset by about one-half a design cycle relative to the circumferentially adjacent lugs of the other set, each lug has a radially outer surface, the surface being bounded by a leading edge, a trailing edge, an axially outer end and an axially inner end, the average distance between the leading and trailing edges defining the radially outer lug width (W), the width (W) of each lug being proportional to the design cycle length encompassing a majority radially outer surface of the lug, wherein the tread has a volume of lug rubber proportional to the length of the design cycle such that the mass of tread rubber circumferentially positioned around any 90° portion of the tire is uniform within plus or minus 5% and the tread has a total lug contacting surface area, when measured using a normally inflated and loaded tire contacting a flat hard surface as a percentage of the total area between the first and second lateral edges measured 360° around the tire of less than 30% and wherein the lugs of the first and second set have a lug height $l_h$, $l_h$ being about 1.35 times R1, R1 being an industry standard lug depth specified for agricultural tire of a particular size.

2. The agricultural tire of claim 1 wherein at least 80% of the radial outer surface of each lug is located within one design cycle.

3. The agricultural tire of claim 2 wherein each design cycle has a leading and a trailing boundary line, the leading and trailing boundary lines define a design cycle, the leading and trailing boundary lines being parallel to either the leading or trailing edge of a lug over 80% of the lugs length.

4. The agricultural tire of claim 3 wherein the boundary lines are coincident with the respective leading edge of the lugs.

5. The agricultural tire of claim 3 wherein the boundary lines are coincident with the respective trailing edges of the lugs.

6. The agricultural tire of claim 3 wherein the boundary lines are spaced between a leading edge and a trailing edge of two circumferentially adjacent lugs.

7. The agricultural tire of claim 1 wherein each lug extends from its respective tread edge to beyond the equatorial plane.

8. The agricultural tire of claim 7 wherein the tire has a size 650/75 R32.

9. The agricultural tire of claim 1 wherein the design cycles have three design cycle lengths, the three design cycle lengths including a small length (S), a large length (L) and a medium length (M), wherein the medium length (M) has a greater length than the length of the small length (S) and a smaller length than the length of the large length (L).

10. The agricultural tire of claim 9 wherein the small length (S), the medium length (M) and the large length (L) design cycles are arranged in a sequence as follows, LLSSSSSLLLLLLLLSSML.

11. The agricultural tire of claim 9 wherein the design cycle lengths have a ratio of 20:22:25.

12. The agricultural tire of claim 1 wherein the design cycles each have laterally extending boundaries, the boundaries linearly extending parallel to the axis of rotation.

13. The agricultural tire of claim 1 wherein the lugs each have a leading a trailing edge and the design cycles each have laterally extending boundaries, the boundaries being parallel to and coincident with either a leading or a trailing edge of the lugs.

14. The agricultural tire of claim 1 wherein the small length (S) and the large length (L) design cycles are arranged in a sequence of small length (S) and large length (L) as follows, LSSSSSSSSSSLLLLLLLL.

15. The agricultural tire of claim 14 wherein the ratio of the small length (S) to the large length (L) is ratio of 10:11.

16. The tire of claim 1 wherein the design cycle length the ratio of the large length to the small length is about 1.25:1.

17. The agricultural tire of claim 1 wherein the design cycles are arranged in a sequence having no more than two consecutive cycles of the same size.

18. The agricultural tire of claim 17 wherein the different design cycle lengths include a medium length (M) and the small length (S), the medium length (M) and the large length (L) design cycles are arranged in a sequence as follows, LLMSSMSSLSSMLMLLMLM.

* * * * *